(12) United States Patent
Kim et al.

(10) Patent No.: US 9,874,772 B2
(45) Date of Patent: Jan. 23, 2018

(54) FLEXIBLE DISPLAY AND MANUFACTURING METHOD THEREOF

(71) Applicant: Samsung Display Co., Ltd., Yongin-si, Gyeonggi-do (KR)

(72) Inventors: Youn Joon Kim, Seoul (KR); Jung Hun Lee, Hwaseong-si (KR); Sang Jo Lee, Hwaseong-si (KR); Jusuck Lee, Seoul (KR); Kyung Min Choi, Seoul (KR)

(73) Assignee: Samsung Display Co., Ltd., Gyeonggi-Do (KR)

( * ) Notice: Subject to any disclaimer, the term of this patent is extended or adjusted under 35 U.S.C. 154(b) by 0 days.

(21) Appl. No.: 14/968,602

(22) Filed: Dec. 14, 2015

(65) Prior Publication Data
US 2016/0255713 A1    Sep. 1, 2016

(30) Foreign Application Priority Data
Feb. 26, 2015    (KR) .................. 10-2015-0027325

(51) Int. Cl.
*H05K 1/02*    (2006.01)
*G02F 1/1333*    (2006.01)
(Continued)

(52) U.S. Cl.
CPC ........ *G02F 1/133305* (2013.01); *G09F 9/301* (2013.01); *B32B 7/14* (2013.01); *B32B 37/0076* (2013.01); *B32B 37/1292* (2013.01); *B32B 2457/20* (2013.01); *B32B 2457/206* (2013.01); *B32B 2457/208* (2013.01); *C09J 2203/318* (2013.01); *C09J 2203/326* (2013.01);
(Continued)

(58) Field of Classification Search
CPC .......... G06F 1/1652; G09F 9/301; G02F 1/13; B32B 7/14; B32B 37/0076; B32B 37/1292; B32B 2457/20; B32B 2457/206; B32B 2457/208; Y10T 428/10; Y10T 428/1036; Y10T 428/1059; C09J 2203/326; C09J 2203/318
See application file for complete search history.

(56) References Cited

U.S. PATENT DOCUMENTS

| 7,710,370 | B2 | 5/2010 | Slikkerveer et al. |
| 8,001,711 | B2 | 8/2011 | LaFarre et al. |

(Continued)

FOREIGN PATENT DOCUMENTS

| CN | 103927941 A | * 7/2014 | ............. B32B 37/12 |
| JP | 2007-215578 A | 8/2007 | |

(Continued)

*Primary Examiner* — Eli D Strah
(74) *Attorney, Agent, or Firm* — Knobbe Martens Olson & Bear LLP

(57) ABSTRACT

A flexible display and method of manufacturing the same are disclosed. In one aspect, the flexible display includes a display panel configured to display images, a window substrate disposed on a first surface of the display panel, and a lower passivation film attached to a second surface of the display panel opposing the first surface. The flexible display can also include a lower adhesive layer interposed between the display panel and the lower passivation film. The lower adhesive layer can include a plurality of isolated-pattern portions and a peripheral portion surrounding the isolated-pattern portions.

20 Claims, 12 Drawing Sheets

(51) Int. Cl.
   *G09F 9/30* (2006.01)
   *B32B 37/00* (2006.01)
   *B32B 7/14* (2006.01)
   *B32B 37/12* (2006.01)
   *G06F 1/16* (2006.01)

(52) U.S. Cl.
   CPC ........ *G02F 2202/28* (2013.01); *G06F 1/1652* (2013.01); *Y10T 428/10* (2015.01); *Y10T 428/1036* (2015.01); *Y10T 428/1059* (2015.01)

(56) References Cited

U.S. PATENT DOCUMENTS

| | | | | |
|---|---|---|---|---|
| 2013/0127776 A1* | 5/2013 | Guard | ................... | G06F 3/0412 345/174 |
| 2014/0295150 A1* | 10/2014 | Bower | ................... | C09J 7/02 428/201 |
| 2015/0004345 A1* | 1/2015 | Chaung | ................... | C09J 5/06 428/41.7 |
| 2015/0181731 A1* | 6/2015 | Lin | ................... | B32B 37/12 361/749 |
| 2016/0163765 A1* | 6/2016 | Hu | ................... | H01L 27/156 257/93 |

FOREIGN PATENT DOCUMENTS

JP   2012-199546 A   10/2012
KR   10-2012-0130919 A   12/2012

\* cited by examiner

FLEXIBLE DISPLAY AND MANUFACTURING METHOD THEREOF

RELATED APPLICATIONS

This application claims priority to and the benefit of Korean Patent Application No. 10-2015-0027325 filed in the Korean Intellectual Property Office on Feb. 26, 2015, the entire contents of which are incorporated herein by reference.

BACKGROUND

Field

The described technology generally relates to a flexible display and a manufacturing method thereof.

Description of the Related Technology

Display devices are computer output devices that enable users to directly view a representation of the results processed by a computer by displaying the representation on a screen.

Display devices can be categorized based on their display technology into cathode ray tube (CRT) displays, liquid crystal displays (LCDs), organic light-emitting diode (OLED) displays, electrophoretic displays (EPDs), and the like. Display devices have been continuously updated to be used in applications such as television receivers, portable communication devices, wearable electrode devices, and the like, and are currently used as outputs for computers.

LCDs, OLED displays, EPDs, and the like, can be manufactured as a flat panel and can be easily formed to be larger, thinner, and lighter, and as a result have become among the leading products in the display industry. Further, flexible displays including a flexible or stretchable substrate that can be wholly bent, rolled, or stretched by external force have been developed.

Flexible displays can be implemented in various ways according the desired application or intended use, which can include a foldable display, a rollable display, a stretchable display, and the like.

The above information disclosed in this Background section is only intended to facilitate the understanding of the background of the described technology and therefore it may contain information that does not form the prior art that is already known in this country to a person of ordinary skill in the art.

SUMMARY OF CERTAIN INVENTIVE ASPECTS

One inventive aspect is a flexible display that can reduce the occurrence of layer-shearing or delamination even when the display is repeatedly rolled or folded by forming isolated-patterns with partially different characteristics at an adhesive layer that consists of an interlayer adhesive structure.

Another aspect is a manufacturing method of a flexible display that can form an interlayer adhesive structure by forming isolated-patterns with partially different characteristics at an adhesive layer.

Another aspect is flexible display including a display panel configured to display images; a window substrate formed to cover one surface of the display panel; a lower passivation film attached to another surface of the display panel; and a lower adhesive layer interposed between the display panel and the lower passivation film to attach the lower passivation film to the display panel, wherein the lower adhesive layer includes predetermined isolated-pattern portions and predetermined peripheral portions surrounding the isolated-pattern portion.

The isolated-pattern portion can be formed with an empty space.

The isolated-pattern portion can be formed of an adhesive material different from that of the peripheral portion.

The isolated-pattern portions can be formed to have a plurality of polygonal patterns that are spaced apart from each other.

The flexible display can further include a winding cylinder at which one end of the display panel is fixed to be rolled, and the isolated-pattern portions can be formed more densely as they become farther from the winding cylinder.

The lower adhesive layer can include at least two layers, and the two layers can have isolated-patterns with different arrangements from each other.

The flexible display can further include a touch screen panel formed between the window substrate and the display panel to sense a predetermined touch, and a window adhesive layer interposed between the window substrate and the touch screen panel to attach the window substrate to the touch screen panel, wherein the window adhesive layer includes the isolated-pattern portions and the peripheral portions surrounding the isolated-pattern portions, and the isolated-pattern portions are formed to have a different characteristic from the peripheral portions.

The isolated-pattern portion of the window adhesive layer can be formed with an empty space.

The isolated-pattern portion of the window adhesive layer can be formed of an adhesive material different from that of the peripheral portion.

The isolated-pattern portions of the window adhesive layer can be formed to have a plurality of polygonal patterns that are spaced apart from each other.

The flexible display can further include a winding cylinder at which one end of the display panel is fixed to be rolled, and the isolated-pattern portions of the window adhesive layer can be formed more densely as they become farther from the winding cylinder.

The window adhesive layer can include at least two layers, and the two layers have isolated-patterns with different arrangements from each other.

The flexible display can further include a Touch Screen Panel (TSP) adhesive layer interposed between the display panel and the touch screen panel to attach the touch screen panel to the display panel, and the TSP adhesive layer can include the isolated-pattern portions and the peripheral portions surrounding the isolated-pattern portions, and the isolated-pattern portions can be formed to have a different characteristic from the peripheral portions.

The isolated-pattern portion of the TSP adhesive layer can be formed with an empty space.

The isolated-pattern portion of the TSP adhesive layer can be formed of an adhesive material different from that of the peripheral portion.

The isolated-patterns portion of the TSP adhesive layer can be formed to have a plurality of polygonal patterns that are spaced apart from each other.

The flexible display can further include a winding cylinder at which one end of the display panel is fixed to be rolled, and the isolated-pattern portions of the TSP adhesive layer can be formed more densely as they become farther from the winding cylinder.

The TSP adhesive layer can include at least two layers, and the two layers can have isolated-patterns with different arrangements from each other.

The flexible display can further include an optical film formed between the window substrate and the touch screen panel; and an optical film adhesive layer interposed between the optical film and the touch screen panel to attach the optical film to the touch screen panel, and the optical film adhesive layer can include the isolated-pattern portions and the peripheral portions surrounding the isolated-pattern portions, and the isolated-pattern portions can be formed to have a different characteristic than the peripheral portions.

The isolated-pattern portion of the optical film adhesive layer can be formed with an empty space.

The isolated-pattern portion of the optical film adhesive layer can be formed of an adhesive material different from that of the peripheral portion.

The isolated-pattern portion of the optical film adhesive layer can be formed to have a plurality of polygonal patterns that are spaced apart from each other.

The flexible display can further include a winding cylinder at which one end of the display panel is fixed to be rolled, and the isolated-pattern portions of the optical film adhesive layer can be formed more densely as they become farther from the winding cylinder.

The optical film adhesive layer can include at least two layers, and the two layers can have isolated-patterns with different arrangements from each other.

Another aspect is a method of manufacturing a flexible display, including arranging a mask that has a pattern corresponding to isolated-pattern portions on a panel; coating an adhesive layer material on the panel covered by the mask; hardening the adhesive layer material; and forming an adhesive layer including the isolated-pattern portion and the peripheral portion by removing the mask from the panel.

Another aspect is a method of manufacturing a flexible display, including: coating an adhesive layer material on a panel; arranging a mask which has a pattern corresponding to predetermined isolated-pattern portions on the coated adhesive layer material; hardening the adhesive layer material covered by the mask by irradiating ultraviolet rays thereon; and removing the mask from the adhesive layer material.

Another aspect is a flexible display, comprising a display panel configured to display images; a window substrate disposed on a first surface of the display panel; a lower passivation film attached to a second surface of the display panel opposing the first surface; and a lower adhesive layer interposed between the display panel and the lower passivation film, wherein the lower adhesive layer includes a plurality of isolated-pattern portions and a peripheral portion surrounding the isolated-pattern portions.

In exemplary embodiments, the isolated-pattern portions are defined as a plurality of openings in the peripheral portion of the lower adhesive layer. The isolated-pattern portions can be formed of an adhesive material that is different from that of the peripheral portion. Each of the isolated-pattern portions can be formed to have a polygonal shape and the isolated-pattern portions can be spaced apart from each other. The flexible display can further comprise a winding cylinder fixed to one end of the display panel, wherein the display panel is configured to be rolled around the winding cylinder, and wherein the isolated-pattern portions are arranged to have an increasing density as they become farther away from the winding cylinder.

In exemplary embodiments, the lower adhesive layer includes two layers, and wherein the two layers each include a plurality of isolated-patterns with different arrangements from each other. The flexible display can further comprise a touch screen panel interposed between the window substrate and the display panel; and a window adhesive layer interposed between the window substrate and the touch screen panel, wherein the window adhesive layer includes a plurality of isolated-pattern portions and a peripheral portion surrounding the isolated-pattern portions, and wherein the isolated-pattern portions of the window adhesive layer are configured to distribute stress differently than the peripheral portions of the window adhesive layer.

In exemplary embodiments, the isolated-pattern portions of the window adhesive layer are defined as a plurality of openings in the peripheral portion of the window adhesive layer. The isolated-pattern portions of the window adhesive layer can be formed of an adhesive material that is different from that of the peripheral portion of the window adhesive layer. Each of the isolated-pattern portions of the window adhesive layer can be formed to have a polygonal shape and the isolated-pattern portions of the window adhesive layer can be spaced apart from each other.

In exemplary embodiments, the flexible display further comprises a winding cylinder fixed to one end of the display panel, wherein the display panel is configured to be rolled around the winding cylinder, and wherein the isolated-pattern portions of the window adhesive layer are arranged to have an increasing density as they become farther away from the winding cylinder. The window adhesive layer can include two layers and the two layers can each include a plurality of isolated-patterns with different arrangements from each other.

In exemplary embodiments, the flexible display further comprises a touch screen panel (TSP) adhesive layer interposed between the display panel and the touch screen panel, wherein the TSP adhesive layer includes a plurality of isolated-pattern portions and a peripheral portion surrounding the isolated-pattern portions, and wherein the isolated-pattern portions of the TSP adhesive layer are configured to distribute stress differently than the peripheral portion of the TSP adhesive layer. The isolated-pattern portion of the TSP adhesive layer can be defined as a plurality of openings in the peripheral portion of the TSP adhesive layer. The isolated-pattern portions of the TSP adhesive layer can be formed of an adhesive material different from that of the peripheral portion of the TSP adhesive layer.

In exemplary embodiments, each of the isolated-patterns portion of the TSP adhesive layer are formed to have a polygonal shape and wherein the isolated-pattern portions of the TSP adhesive layer are spaced apart from each other. The flexible display can further comprise a winding cylinder fixed to one end of the display panel, wherein the display panel is configured to be rolled around the winding cylinder, and wherein the isolated-pattern portions of the TSP adhesive layer are arranged to have an increasing density as they become farther away from the winding cylinder.

In exemplary embodiments, the TSP adhesive layer includes two layers, and wherein the two layers each include a plurality of isolated-patterns with different arrangements from each other. The flexible display can further comprise an optical film interposed between the window substrate and the touch screen panel; and an optical film adhesive layer interposed between the optical film and the touch screen panel, wherein the optical film adhesive layer includes a plurality of isolated-pattern portions and a peripheral portion surrounding the isolated-pattern portions, and wherein the isolated-pattern portions of the optical film adhesive layer are configured to distribute stress differently than the peripheral portions of the optical film adhesive layer.

In exemplary embodiments, the isolated-pattern portions of the optical film adhesive layer are defined as a plurality of openings in the peripheral portion of the optical film adhesive layer. The isolated-pattern portions of the optical film adhesive layer can be formed of an adhesive material different from that of the peripheral portion of the optical film adhesive layer. Each of the isolated-pattern portions of the optical film adhesive layer can be formed to have a polygonal shape and the isolated-patter portions of the optical film adhesive layer can be spaced apart from each other.

In exemplary embodiments, the flexible display further comprises a winding cylinder fixed to one end of the display panel, wherein the display panel is configured to be rolled around the winding cylinder, wherein the isolated-pattern portions of the optical film adhesive layer are arranged to have an increasing density as they become farther away from the winding cylinder. the optical film adhesive layer includes two layers, and wherein the two layers each include a plurality of isolated-patterns with different arrangements from each other.

Another aspect is a method of manufacturing a flexible display, comprising arranging a mask that has a pattern over a panel; coating an adhesive layer material on the panel covered by the mask; hardening the adhesive layer material; and forming an adhesive layer including a plurality of isolated-pattern portions and peripheral portions which correspond to the pattern of the mask by removing the mask from the panel.

Another aspect is a method of manufacturing a flexible display, comprising coating an adhesive layer material on a panel; arranging a mask which has a pattern over the coated adhesive layer material; hardening the adhesive layer material covered by the mask by irradiating ultraviolet rays thereon through the pattern in the mask; and removing the mask from the adhesive layer material.

According to at least one embodiment, it is possible to reduce layer-shearing or delamination when a flexible display is repeatedly rolled or folded by forming isolated-patterns with partially different characteristics on an adhesive layer that including an interlayer adhesive structure.

DETAILED DESCRIPTION OF CERTAIN INVENTIVE EMBODIMENTS

Figure 1:
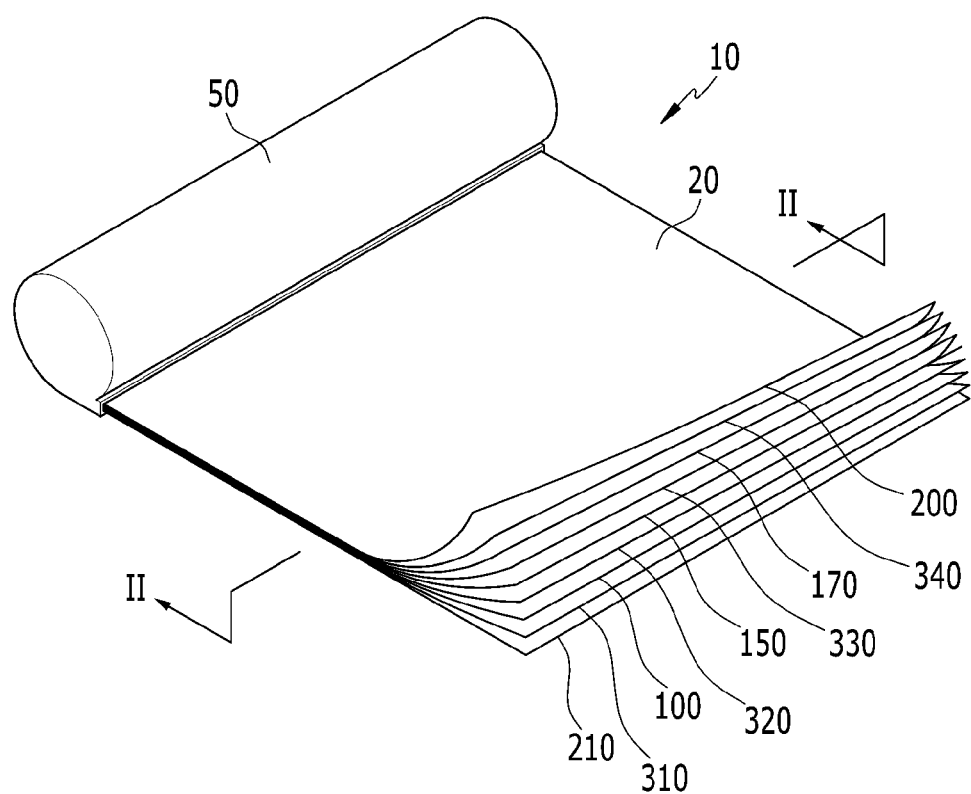
FIG. 1 is a perspective view of a flexible display according to an exemplary embodiment.

Rollable or foldable displays can be formed to have a laminated structure in which a display panel, a touch screen panel, a window substrate, and the like are laminated by interposing adhesive layers therebetween to be attached to each other. In the laminated structure, however, different amounts of stress can be applied to different areas of the display when the display is rolled or folded.

As such, in a rollable or foldable display, stress can be accumulated in specific regions. For example, the area where the display panel is initially rolled or bent can receive a greater amount of stress than the areas farther away from the initial region. Additionally, shear stress can occur between the laminated layers, which may cause a layer-shearing problem, a delamination problem, or the like.

The described technology will be described more fully hereinafter with reference to the accompanying drawings, in which exemplary embodiments are shown.

As those skilled in the art would realize, the described embodiments may be modified in various different ways, all without departing from the spirit or scope of the described technology.

The drawings and description are to be regarded as illustrative in nature and not restrictive. Like reference numerals designate like elements throughout the specification.

In addition, the sizes and thicknesses of each component shown in the drawings may be exaggerated for the sake of clarity and ease of description, but the described technology is not limited thereto.

In addition, throughout the specification, the term "on" implies being positioned above or below a target element and does not imply being necessarily positioned on the top of the target element based on the orientation of the elements with respect to the ground.

In addition, unless explicitly described to the contrary, the word "comprise" and variations such as "comprises" or "comprising" will be understood to imply the inclusion of stated elements, but not the exclusion of any other elements.

Flexible displays according to exemplary embodiments will now be described in detail with reference to the accompanying drawings.

Figure 2:
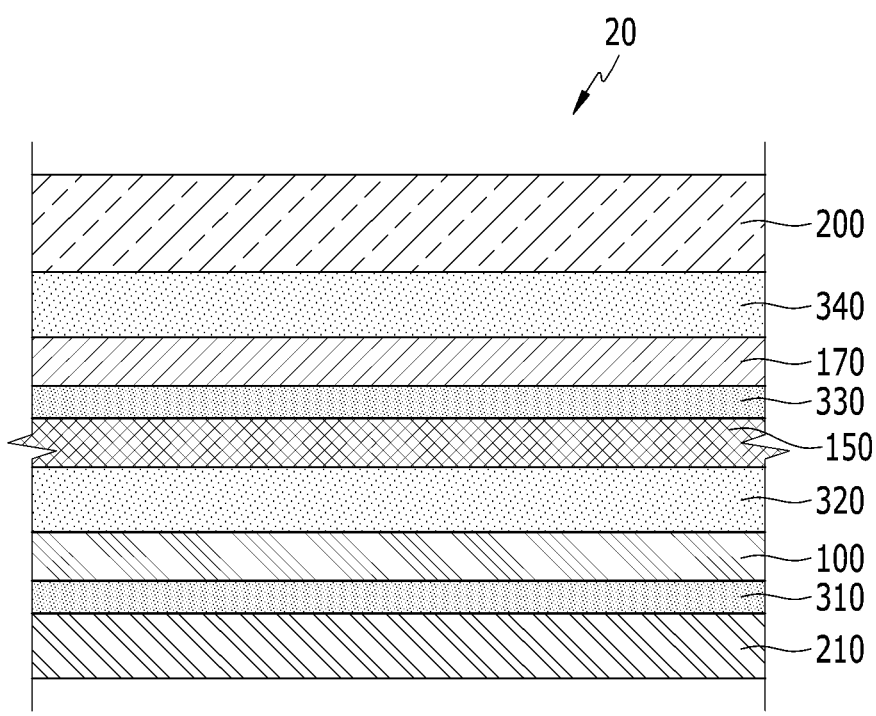
FIG. 2 is a partial cross-sectional view of FIG. 1 taken along line II-II.

FIG. 1 is a perspective view of a flexible display according to an exemplary embodiment. FIG. 2 is a partial cross-sectional view of FIG. 1 taken along line II-II.

Referring to FIG. 1, a flexible display 10 includes a panel assembly 20 in which a display panel and a touch screen panel are covered and protected by a window substrate 200. The panel assembly 20 further includes a display area (DA) configured to display an image and a non-display area (ND) that can include a driving circuit, a frame, and the like.

A rolling housing 50 that includes a winding axis at which one end of the panel assembly 20 is fixed to be rolled is provided at one side of the flexible display 10.

Referring to FIG. 2, in which a cross-sectional configuration of the panel assembly 20 of the flexible display 10 is illustrated more fully, a touch screen panel 150 is formed over of the display panel 100, and a window substrate 200 is formed over the touch screen panel 150, such that the display panel 100 and the touch screen panel 150 are covered by the window substrate 200.

The display panel 100 includes a plurality of pixels arranged in a matrix to display images. The display panel 100 can be formed as an organic light-emitting diode (OLED) panel in at least one exemplary embodiment.

Since the display panel 100 is formed on a flexible substrate so as to be flexible, the display panel 100 can be formed as a curved, bendable, foldable, rollable, or stretchable panel.

A lower passivation film 210 is formed below the display panel 100 to protect the display panel 100.

The lower passivation film 210 can be formed of a flexible plastic film, such as polyimide (PI) and polyethylene terephthalate (PET).

A display panel adhesive layer 310 is interposed between the lower passivation film 210 and the display panel 100 to attach the display panel 100 to the lower passivation film 210.

The display panel adhesive layer 310 can be formed of a pressure sensitive adhesive (PSA) and can be used in as adhesive tape or as an adhesive material that is coated and then hardened.

The pressure sensitive adhesive can include an adhesive material (A) that forms an adhesive bond when pressure is applied thereto. The touch screen panel 150 is formed over of the display panel 100.

When an optical film is formed on the display panel 100, the touch screen panel 150 can be formed on the optical film and a touch screen panel (TSP) adhesive layer 320 can be interposed between the display panel 100 and the touch screen panel 150 to attach the touch screen panel 150 to the display panel 100.

The TSP adhesive layer 320 can be formed of a PSA and can be used as an adhesive tape or as an adhesive material that is coated and then hardened.

When a touch input is received and the window substrate 200 is connected to the upper portion of the touch screen panel 150, the touch screen panel 150 can sense the position of the touch input applied to the window substrate 200.

In the present exemplary embodiment, the touch screen panel 150 can be formed of a panel that senses changes in capacitance, but the described technology is not limited thereto. For example, the touch screen panel 150 can be a resistive film, an ultrasonic, or an infrared type touch screen panel 150.

An optical film 170 can be formed over the touch screen panel 150 or can be formed over the display panel 100.

The optical film 170 can include a polarization film and a phase difference film. The polarization film can polarize light incident on the display panel 100 and light that is reflected from the display panel 100. The phase difference film can be formed adjacent to the display panel 100 rather than on the polarization film to control the phases of the incident light and the reflected light.

The optical film adhesive layer 330 is interposed between the optical film 170 and the touch screen panel 150 to attach the optical film 170 to the touch screen panel 150.

The optical film adhesive layer 330 can be formed of a pressure sensitive adhesive (PSA) and can be used as an adhesive tape or as an adhesive material that is coated and then hardened.

The window substrate 200 is formed to have an area that is greater than that of the display panel 100 and the touch screen panel 150 to cover the display panel 100 and the touch screen panel 150. The window substrate 200 may include flexible material such as polymer. In another embodiment, the window substrate may include rigid material such as glass.

A window adhesive layer 340 is interposed between the touch screen panel 150 and the window substrate 200 to attach the window substrate 200 to the touch screen panel 150.

The window adhesive layer 340 can be formed of a pressure sensitive adhesive (PSA) and can be used as an adhesive tape or as an adhesive material that is coated and then hardened.

Figure 3A:
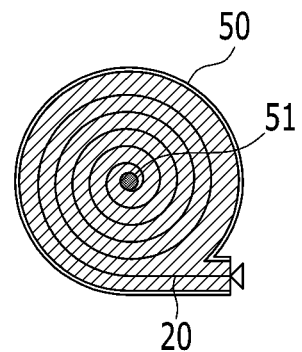
FIG. 3A is a cross-sectional view illustrating a configuration in which the flexible display shown in FIG. 1 is rolled.
Figure 3B:
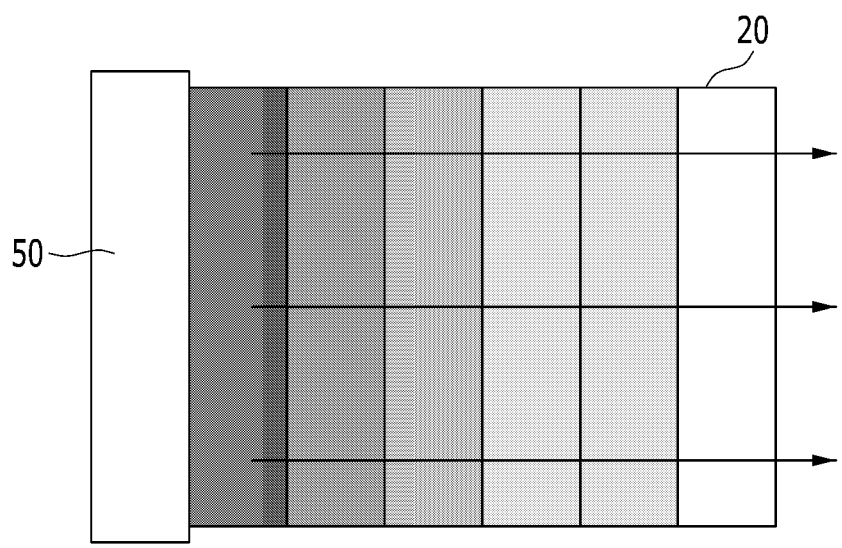
FIGS. 3B and 3C are schematic diagrams illustrating the magnitude of shear stress applied to each region of a panel assembly when the flexible display is rolled.
Figure 3C:
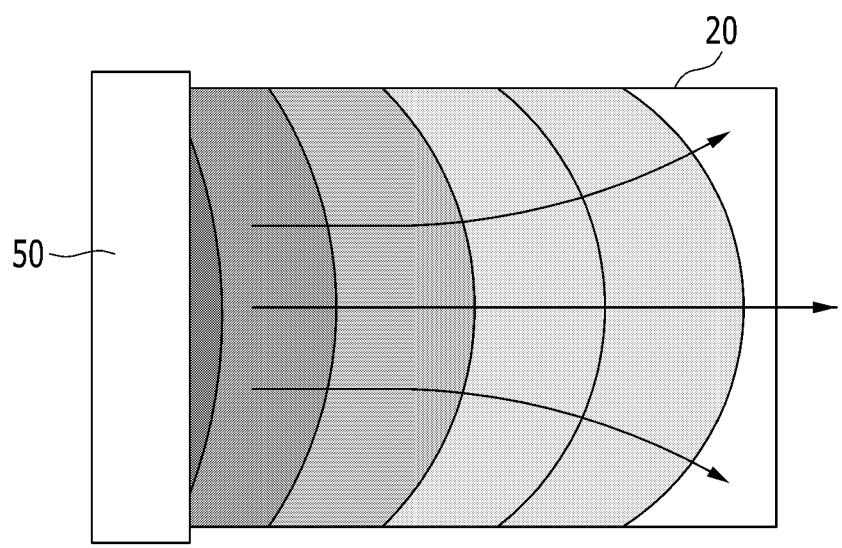

FIG. 3A is a cross-sectional view illustrating a configuration in which the flexible display shown in FIG. 1 is rolled. FIGS. 3B and 3C are schematic diagrams illustrating the magnitude of shear stress applied to each region of a panel assembly when the flexible display is rolled.

As shown in FIG. 3A, the panel assembly 20 is wound around a winding axis or winding cylinder 51 and can be stored in a rolling housing 50. The winding cylinder can include an axis around which it can be rotated.

As described above, since the panel assembly 20 includes the lower passivation film, the display panel, the touch screen panel, the optical film, the window substrate, and so on with the adhesive layers laminated therebetween, when the panel assembly 20 is rolled around the winding axis 51, shear stress may accumulate from an inward portion of the panel assembly close to the winding axis 51.

Accordingly, as shown FIG. 3B or 3C, a greater shear stress is applied to a region of the panel assembly 20 closer to the winding axis 51 than farther away from the winding axis 51, and since the accumulated amount of the shear stress is less farther from the winding axis 51, the least amount of shear stress is applied to an end portion of the panel assembly 20.

Accordingly, it is desirable that the accumulated shear stress be substantially uniformly distributed throughout the entire region of the panel assembly.

Figure 4:
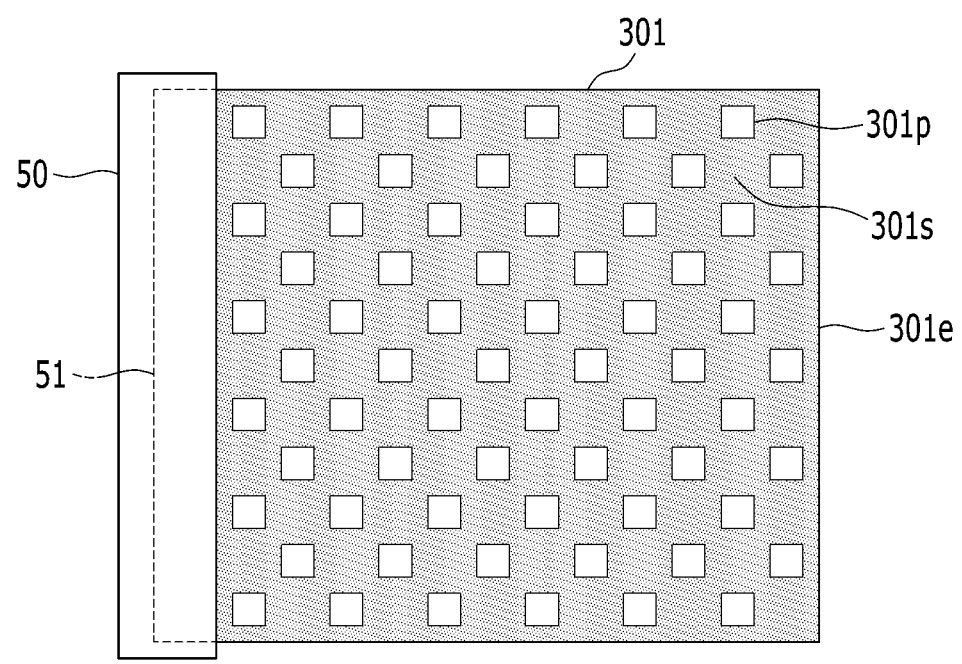
FIG. 4 is a top plan view of an adhesive layer of a flexible display according to an exemplary embodiment.

FIG. 4 is a top plan view of an adhesive layer of a flexible display according to an exemplary embodiment. An adhesive layer 301 according to the present exemplary embodiment includes an isolated-pattern portion 301p, and a peripheral portion 301s surrounding the isolated-pattern portion 301p, wherein the isolated-pattern portion 301p and the peripheral portion 301s are formed with different characteristics from each other. For example, in some embodiments, the isolated-pattern portion 301p and the peripheral portion 301s distribute stresses applied thereto differently.

For example, the isolated-pattern portion 301p can be formed as an empty space or an opening. In another example, the isolated-pattern portion 301p can be formed of an adhesive material different from that of the peripheral portion 301s or a non-adhesive material.

Referring to FIG. 4, the isolated-pattern portions 301p can be formed to have a plurality of polygonal patterns, for example, a plurality of quadrangular patterns that are spaced apart from each other.

The isolated-pattern portions 301p can be formed to be substantially uniformly distributed throughout the entire region of the panel assembly and can be alternately arranged in columns and rows.

The adhesive layer 301 can be divided into columns based on lines parallel to the winding axis 51 and rows based on lines crossing the columns. As such, in the FIG. 4 embodiment, the isolated-pattern portions 301p arranged in a first column from the end 301e are not formed adjacent to the isolated-pattern portions 301p formed in a second column therefrom in a row direction, but are formed adjacent to the isolated-pattern portions 301p formed in third column therefrom in the row direction.

As such, when the isolated-pattern portions 301p according to the FIG. 4 embodiment are formed, intervals between respective adjacent isolated-pattern portions 301p in horizontal and vertical directions are substantially uniform, and adhesive regions corresponding to the peripheral portions 301s are substantially uniformly distributed, thereby maintaining adhesive performance.

The isolated-pattern portions 301p can be respectively formed to have a polygonal pattern such as a quadrangular, triangular, pentagonal, or hexagonal pattern, but are not limited thereto, and can be formed to have a circular or elliptical pattern.

Figure 5:
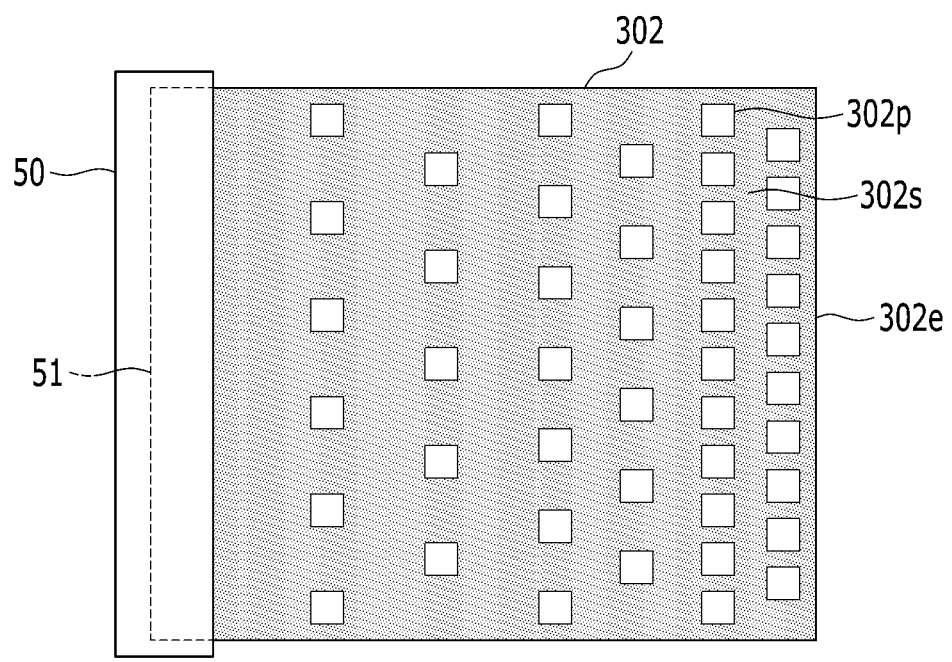
FIG. 5 is a top plan view of an adhesive layer of a flexible display according to another exemplary embodiment.

FIG. 5 is a top plan view of an adhesive layer of a flexible display according to another exemplary embodiment. Referring to FIG. 5, isolated-pattern portions 302p of an adhesive layer 302 according to the present exemplary embodiment are arranged to have an increasing density as they become farther away from the winding axis 51.

That is, the intervals formed between columns are greater at a region of the panel assembly closer to the winding axis 51 installed in a rolling housing 50 so that the isolated-pattern portions 302p are arranged in a relatively smaller number, and the intervals formed between the columns are narrower as they become closer to the end 302e so that the isolated-pattern portions 302p are arranged in a relatively greater number.

In the embodiment of FIG. 5, the isolated-pattern portions 302p are alternately formed in the columns adjacent to each other when the row is changed.

When the isolated-pattern portions are arranged as in the FIG. 5 embodiment and the panel assembly is spiral-wound, the different amounts of stress applied to each region of the panel assembly is compensated for, thereby preventing a layer-shearing problem or delamination problem from occurring.

The isolated-pattern portion 302p and the peripheral portion 302s of the adhesive layer 302 according to the present exemplary embodiment can be formed with different characteristics from each other, for example, the isolated-pattern portion 302p can be formed as an empty space or opening, or the isolated-pattern portion 302p can be formed of an adhesive material different from that of the peripheral portion 301s or a non-adhesive material.

The isolated-pattern portions 301p spaced apart from each other can be respectively formed to have a polygonal pattern such as a quadrangular, triangular, pentagonal, or hexagonal pattern, but are not limited thereto, and can be formed to have a circular or elliptical pattern.

Figure 6:
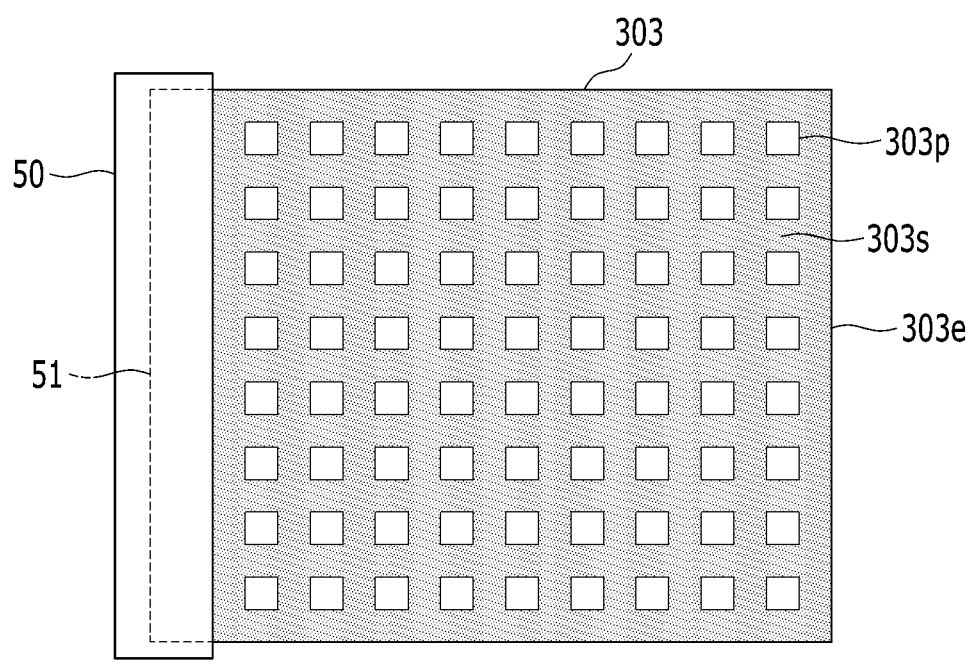
FIG. 6 is a top plan view of an adhesive layer of a flexible display according to a further exemplary embodiment.

FIG. 6 is a top plan view of an adhesive layer of a flexible display according to a further exemplary embodiment. Referring to FIG. 6, isolated-pattern portions 303p of an adhesive layer 303 according to the present exemplary embodiment are substantially uniformly arranged in a matrix throughout an entire region of a panel assembly.

That is, the isolated-pattern portions 303p are successively arranged in rows and columns with substantially uniform intervals.

The isolated-pattern portion 303p and the peripheral portion 303s of the adhesive layer 303 according to the present exemplary embodiment can be formed with different characteristics from each other, for example, the isolated-pattern portion 303p can be formed as an empty space or opening, or the isolated-pattern portion 303p can be formed of an adhesive material different from that of the peripheral portion 303s or a non-adhesive material.

The isolated-pattern portions 303p spaced apart from each other can be respectively formed to have a polygonal pattern such as a quadrangular, triangular, pentagonal, or hexagonal pattern, but are not limited thereto, and may be formed to have a circular or elliptical pattern.

Figure 7:
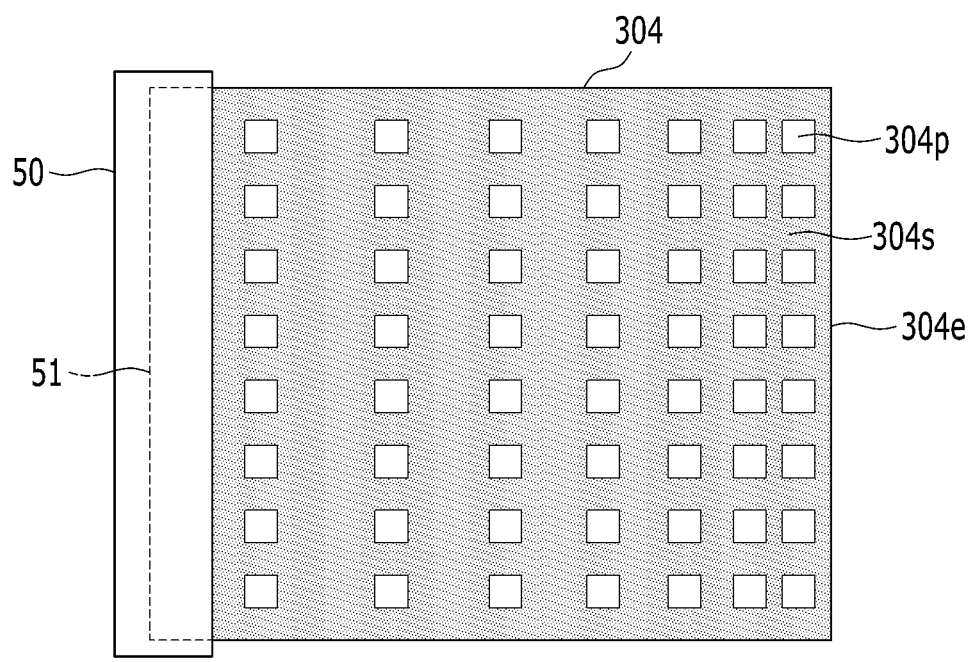
FIG. 7 is a top plan view of an adhesive layer of a flexible display according to a further exemplary embodiment.

FIG. 7 is a top plan view of an adhesive layer of a flexible display according to a further exemplary embodiment. Referring to FIG. 7, isolated-pattern portions 304p of an adhesive layer 304 according to the present exemplary embodiment are formed with the same number in each column and are arranged to have an increasing density to be as they become farther away from the winding axis 51.

That is, intervals formed between columns are greater at a region of the panel assembly closer to the winding axis 51 installed in the rolling housing 50 so that the isolated-pattern portions 304p are arranged in a relatively smaller number, and the intervals formed between the columns are narrower as they become closer to the end 304e so that the isolated-pattern portions 304p are arranged in a relatively greater number.

In the embodiment of FIG. 7, the same number of the isolated-pattern portions 304p are formed in each column.

When the isolated-pattern portions are arranged as in the FIG. 7 embodiment, and the panel assembly is spiral-wound, the different amounts of stress applied to each region of the panel assembly is compensated for, thereby preventing a layer-shearing problem or delamination problem from occurring.

The isolated-pattern portion 304p and the peripheral portion 304s of the adhesive layer 304 according to the present exemplary embodiment can be formed with different characteristics from each other, for example, the isolated-pattern portion 304p can be formed as an empty space or opening or the isolated-pattern portion 304p can be formed of an adhesive material different from that of the peripheral portion 304s or a non-adhesive material.

The isolated-pattern portions 304p spaced apart from each other can be respectively formed to have a polygonal pattern such as a quadrangular, triangular, pentagonal, or hexagonal pattern, but are not limited thereto, and can be formed to have a circular or elliptical pattern.

Figure 8:
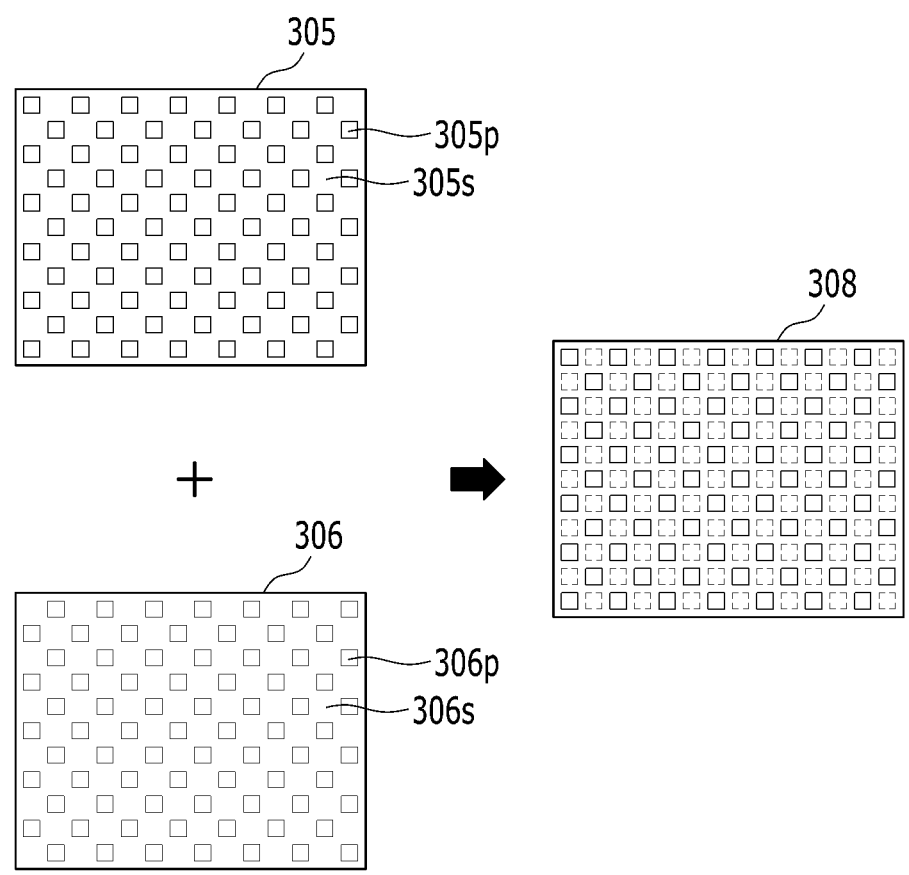
FIG. 8 is a top plan view of an adhesive layer of a flexible display according to a further exemplary embodiment.

FIG. 8 is a top plan view of an adhesive layer of a flexible display according to a further exemplary embodiment. Referring to FIG. 8, an adhesive layer 308 according to the present exemplary embodiment includes at least two layers that overlap each other, and the two layers are formed to have isolated-pattern portions with arrangements different from each other.

That is, the arrangement formed on a first layer 305 can be the same as that of the isolated-pattern portions 301p of the adhesive layer 301 shown in FIG. 4, and the isolated-pattern portions 305p are alternately arranged in each row and column.

In the FIG. 8 embodiment, isolated-pattern portions 306p formed on a second layer 306 can be alternately arranged each row and column, but the arrangement of the isolated-pattern portions 306p formed on the second layer 306 and arrangement of the isolated-pattern portions 305p formed on the first layer 305 are formed alternatively from each other.

As described above, according to the arrangement of the isolated-pattern portions 305p and 306p, the isolated-pattern portions 305p and 306p and the peripheral portions 305s and 306s can be alternately arranged in a sectional direction of the panel assembly 20 as well as in a planar direction thereof.

The isolated-pattern portions 305p and 306p and the peripheral portions 305s and 306s of the adhesive layer 308 according to the present exemplary embodiment can be formed with different characteristics from each other, for example, the isolated-pattern portions 305p and 306p can be formed as an empty space or opening, or the isolated-pattern portions 305p and 306p can be formed of an adhesive material different from that of the peripheral portions 305s and 306s or a non-adhesive material.

The isolated-pattern portions 305p and 306p spaced apart from each other can be respectively formed to have a polygonal pattern such as a quadrangular, triangular, pentagonal, or hexagonal pattern, but are not limited thereto, and can be formed to have a circular or elliptical pattern.

Figure 9:
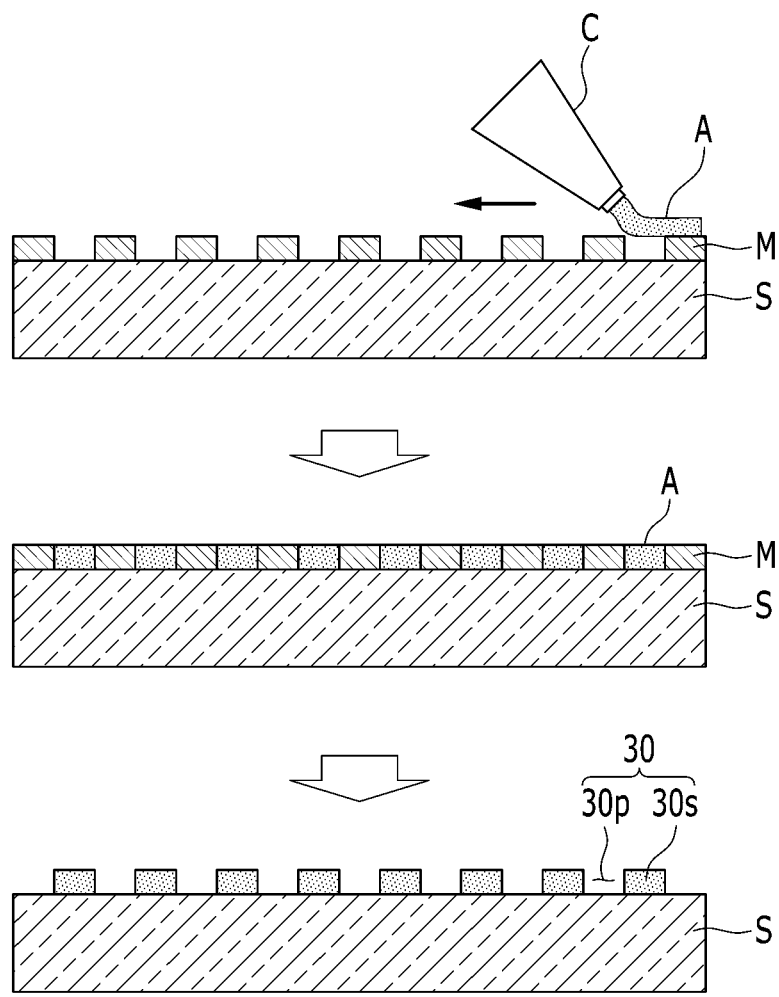
FIG. 9 is a process diagram illustrating the forming of a pattern of adhesive layer in a method of manufacturing a flexible display according to an exemplary embodiment.

FIG. 9 is a process diagram illustrating the forming of a pattern of adhesive layer in a method of manufacturing a flexible display according to an exemplary embodiment.

First, a mask M that has a pattern corresponding to isolated-pattern portions 30p is formed on a panel S. Since the panel S can be a part of a plurality of layers, the panel S can be one of the lower passivation film, the display panel, the touch screen panel, or the polarizer.

Further, the mask M can be prepared to have a pattern corresponding to the pattern of the isolated-pattern portions 30p shown in FIGS. 4 to 8, but is not limited thereto, and the mask M can be prepared to have other patterns not shown herein.

Next, an adhesive layer material (A) is coated on the panel S covered by the mask M.

The adhesive layer material (A) can be formed of a PSA, and the PSA is an adhesive that includes an adhesive material (A) that forms an adhesive bond when pressure is applied thereto.

A coater C can be used to coat the adhesive layer material (A), in which case the coater C coats the panel P that is covered by the mask M while moving in one side direction or the other side direction of the panel.

Next, the coated adhesive layer material (A) is hardened.

A hardening method of the adhesive layer material (A) can be selected depending on the material used, for example, a heat-curing method using heat or a light curing method using light, such as ultraviolet rays, can be selected.

Next, the mask M is removed from the panel S.

After the adhesive layer material (A) is hardened, when the mask M covering the panel S is removed, the hardened adhesive layer material (A) remains to form the adhesive layer 30.

That is, a portion of the adhesive layer material (A) covered by the mask M forms the isolated-pattern portion 30p, and the hardened adhesive layer material (A) forms the peripheral portion 30s, such that the adhesive layer 30 is formed.

When the adhesive layer 30 is formed by the method described above, the isolated-pattern portions 30p formed in the adhesive layer 30 form empty spaces of the adhesive layer 30.

Figure 10:
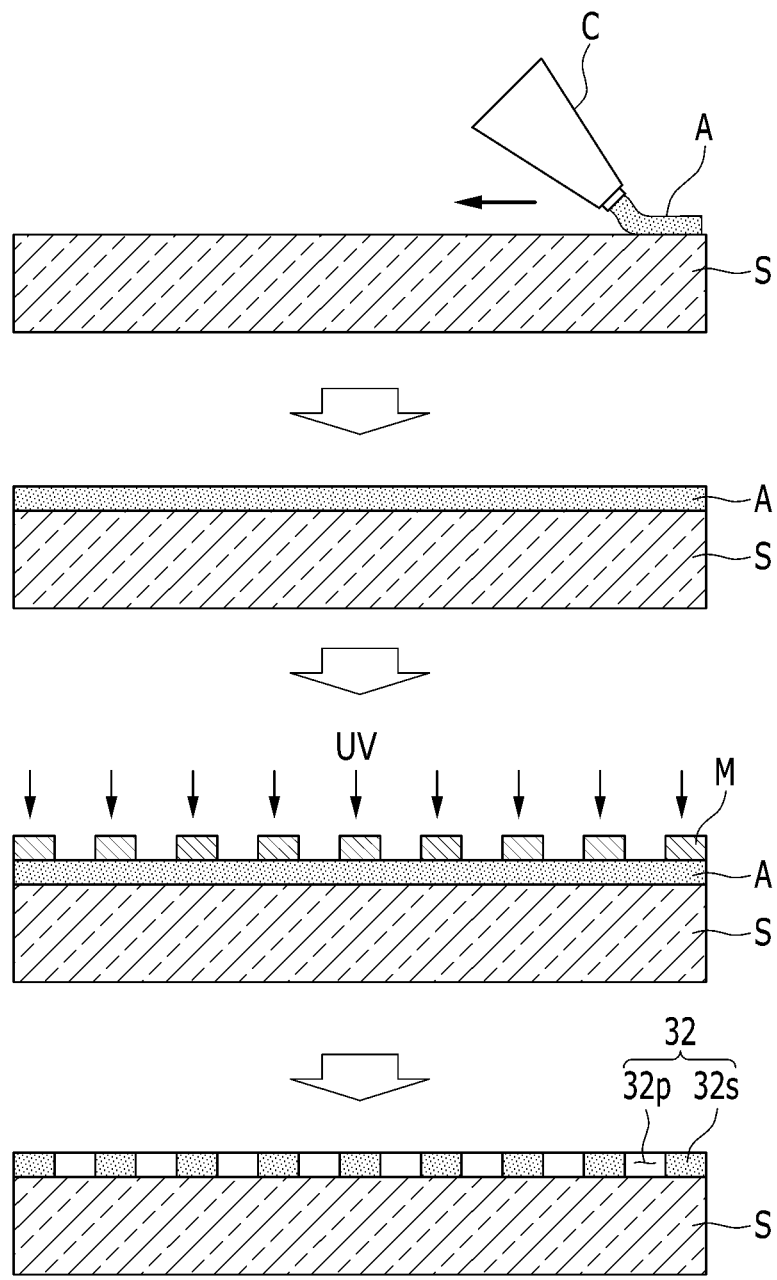
FIG. 10 is another process diagram illustrating the forming of a pattern of adhesive layer in a method of manufacturing a flexible display according to an exemplary embodiment.

FIG. 10 is a process diagram illustrating the forming of a pattern of an adhesive layer in a method of manufacturing a flexible display according to another exemplary embodiment.

First, an adhesive layer material (A) is coated on a panel S.

Since the panel S can be a part of layers on which an adhesive layer (A) is formed, the panel S can be at least one of the lower passivation film, the display panel, the touch screen panel, and the polarizer.

The adhesive layer material (A) can be formed of a pressure sensitive adhesive (PSA), and the PSA includes an adhesive material (A) that forms an adhesive bond when pressure is applied thereto.

A coater C can be used to coat the adhesive layer material (A), in which case the coater C coats the panel S that is covered by the mask M while moving in one side direction or the other side direction of the panel.

Next, a mask M that has a pattern corresponding to isolated-pattern portions 32p is arranged on the coated adhesive layer material (A).

The mask M can be prepared to have a pattern corresponding to the pattern of the isolated-pattern portions shown in FIGS. 4 to 8, but is not limited thereto, and the mask M can be prepared to have other patterns not shown herein.

Next, the adhesive layer material (A) covered by the mask M is hardened by irradiating ultraviolet rays thereto.

In the embodiment of FIG. 10, an adhesive characteristic difference can occur between a portion in which the ultraviolet rays are irradiated and a portion in which the ultraviolet rays are not irradiated due to the mask M. Accordingly, the adhesion of the portion of the adhesive layer material (A) in which the ultraviolet rays are not irradiated can be changed or lost.

Next, the mask M is removed from the adhesive layer material (A).

When the mask M covering the adhesive layer material (A) is removed, an adhesive layer 32 is formed, and the adhesive layer 32 includes the isolated-pattern portions 32p that have the changed adhesive characteristic due to the ultraviolet rays, and peripheral portions 32s that maintain their adhesive characteristic because the ultraviolet rays are not irradiated.

When the adhesive layer 32 is formed according to the method described above, the isolated-pattern portions 32p formed on the adhesive layer 32 have an adhesion different from the peripheral portions 32s.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A flexible display, comprising:
   a display panel configured to display images;
   a window substrate disposed on a first surface of the display panel;
   a lower passivation film attached to a second surface of the display panel opposing the first surface;
   a lower adhesive layer interposed between the display panel and the lower passivation film; and
   a winding cylinder fixed to one end of the display panel,
   wherein the lower adhesive layer includes a plurality of isolated-pattern portions and a peripheral portion surrounding the isolated-pattern portions,
   wherein the display panel is configured to be rolled around the winding cylinder, and
   wherein the isolated-pattern portions are arranged to have an increasing density as they become farther away from the winding cylinder.

2. The flexible display of claim 1, wherein the isolated-pattern portions are defined as a plurality of openings in the peripheral portion of the lower adhesive layer.

3. The flexible display of claim 1, wherein the isolated-pattern portions are formed of an adhesive material that is different from that of the peripheral portion.

4. The flexible display of claim 1, wherein each of the isolated-pattern portions are formed to have a polygonal shape and wherein the isolated-pattern portions are spaced apart from each other.

5. The flexible display of claim 1, wherein the lower adhesive layer includes two layers, and wherein the two layers each include a plurality of isolated-pattern portions with different arrangements from each other.

6. The flexible display of claim 1, further comprising: a touch screen panel interposed between the window substrate and the display panel; and a window adhesive layer interposed between the window substrate and the touch screen panel, wherein the window adhesive layer includes a plurality of isolated-pattern portions and a peripheral portion surrounding the isolated-pattern portions, and wherein the isolated-pattern portions of the window adhesive layer are configured to distribute stress differently than the peripheral portion of the window adhesive layer.

7. The flexible display of claim 6, wherein the isolated-pattern portions of the window adhesive layer are defined as a plurality of openings in the peripheral portion of the window adhesive layer.

8. The flexible display of claim 6, wherein the isolated-pattern portions of the window adhesive layer are formed of an adhesive material that is different from that of the peripheral portion of the window adhesive layer.

9. The flexible display of claim 6 wherein each of the isolated-pattern portions of the window adhesive layer are formed to have a polygonal shape and wherein the isolated-pattern portions of the window adhesive layer are spaced apart from each other.

10. The flexible display of claim 6, wherein the window adhesive layer includes two layers, and wherein the two layers each include a plurality of isolated-pattern portions with different arrangements from each other.

11. The flexible display of claim 6, further comprising a touch screen panel (TSP) adhesive layer interposed between the display panel and the touch screen panel, wherein the TSP adhesive layer includes a plurality of isolated-pattern portions and a peripheral portion surrounding the isolated-pattern portions, and wherein the isolated-pattern portions of the TSP adhesive layer are configured to distribute stress differently than the peripheral portion of the TSP adhesive layer.

12. The flexible display of claim 11, wherein the isolated-pattern portions of the TSP adhesive layer are defined as a plurality of openings in the peripheral portion of the TSP adhesive layer.

13. The flexible display of claim 11, wherein the isolated-pattern portions of the TSP adhesive layer are formed of an adhesive material different from that of the peripheral portion of the TSP adhesive layer.

14. The flexible display of claim 11, wherein each of the isolated-pattern portions of the TSP adhesive layer are formed to have a polygonal shape and wherein the isolated-pattern portions of the TSP adhesive layer are spaced apart from each other.

15. The flexible display of claim 11, wherein the TSP adhesive layer includes two layers, and wherein the two layers each include a plurality of isolated-pattern portions with different arrangements from each other.

16. The flexible display of claim 6, further comprising: an optical film interposed between the window substrate and the touch screen panel; and an optical film adhesive layer interposed between the optical film and the touch screen panel, wherein the optical film adhesive layer includes a plurality of isolated-pattern portions and a peripheral portion surrounding the isolated-pattern portions, and wherein the isolated-pattern portions of the optical film adhesive layer are configured to distribute stress differently than the peripheral portion of the optical film adhesive layer.

17. The flexible display of claim 16, wherein the isolated-pattern portions of the optical film adhesive layer are defined as a plurality of openings in the peripheral portion of the optical film adhesive layer.

18. The flexible display of claim 16, wherein the isolated-pattern portions of the optical film adhesive layer are formed of an adhesive material different from that of the peripheral portion of the optical film adhesive layer.

19. The flexible display of claim 16, wherein each of the isolated-pattern portions of the optical film adhesive layer are formed to have a polygonal shape and wherein the isolated-pattern portions of the optical film adhesive layer are spaced apart from each other.

20. The flexible display of claim 16, wherein the optical film adhesive layer includes two layers, and wherein the two layers each include a plurality of isolated-pattern portions with different arrangements from each other.

* * * * *